United States Patent [19]
Lang et al.

[11] 3,810,136

[45] May 7, 1974

[54] DIGITAL POSITION SENSOR

[75] Inventors: Charles W. Lang, Wayne; Peter J. O'Hara, Denville, both of N.J.

[73] Assignee: The Singer Company, Little Falls, N.J.

[22] Filed: Feb. 15, 1973

[21] Appl. No.: 332,682

[52] U.S. Cl................. 340/199, 340/206, 336/132
[51] Int. Cl...................... G08c 19/08, G08c 19/16
[58] Field of Search........................... 340/199, 196

[56] References Cited
UNITED STATES PATENTS

| | | | |
|---|---|---|---|
| 3,005,939 | 10/1961 | Fromer | 340/199 |
| 3,154,946 | 11/1964 | Ordorica | 340/196 |

*Primary Examiner*—Thomas B. Habecker

[57] ABSTRACT

A reliable digital shaft encoder capable of operating at high speeds is shown. A plurality of magnetic segments are embedded in the rotor of the encoder forming two staggered rows. The stator contains a plurality of E shaped magnetic strips through which excitation and pickup coils are wound. Magnetic coupling from the stator strips through the rotor segments induces a voltage in the pickup coils which is then demodulated to provide a position indication.

15 Claims, 8 Drawing Figures

PATENTED MAY 7 1974   3,810,136

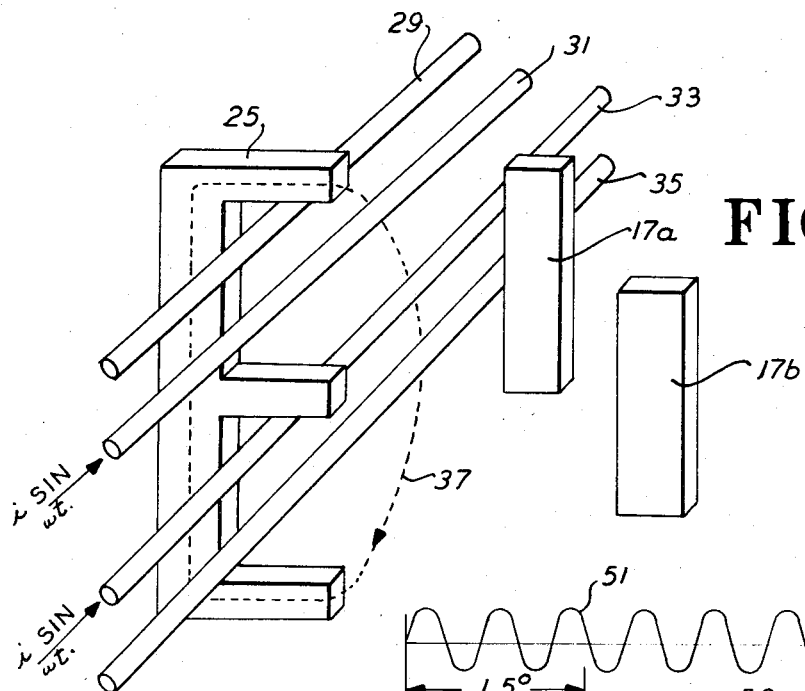
FIG. 2
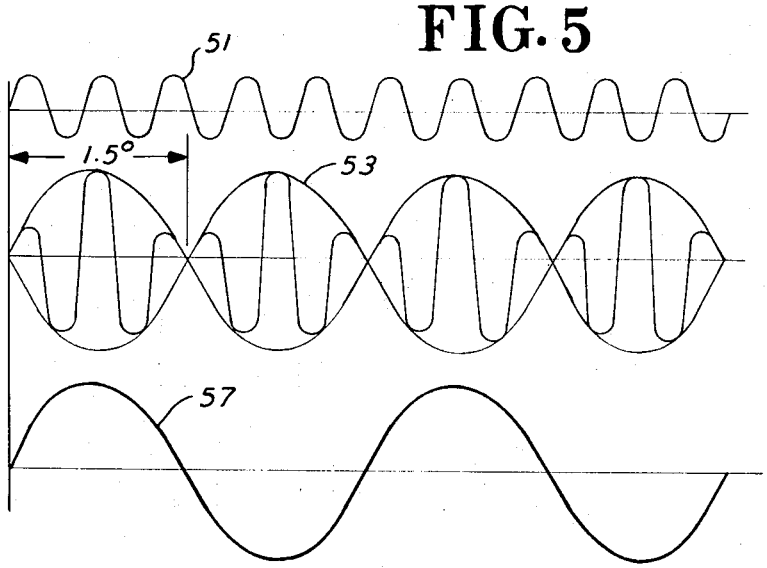
FIG. 5
FIG. 6
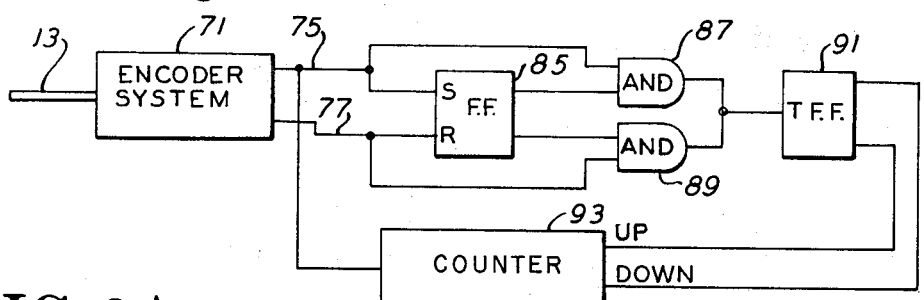
FIG. 6A
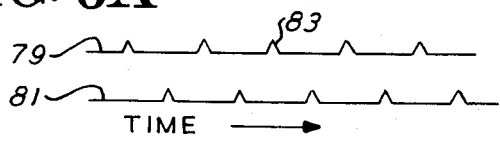

DIGITAL POSITION SENSOR

BACKGROUND OF THE INVENTION

This invention relates to digital position sensors in general, and more particularly, to an improved digital position sensor which utilizes magnetic coupling. Before the advent of digital computers, most position sensors were in the form of potentiometers or the like which provided an analog output proportional to a position input. The need to provide digital type inputs to digital computers from external sensors led to two types of position sensing input systems. In one type, the analog voltage was basically converted in an analog-to-digital converter to provide the necessary digital input. The other development took the form of using encoders to provide this input. In particular, a large number of shaft encoders which provide rotational position and velocity information have been developed. In general, devices working on four basic principles have been used for this purpose. The first type of encoder is the contact type in which contact is generally made through brushes contacting slip rings or commutators. The main drawback in this type of devices is that it will only work at low speeds. In addition, it suffers from the problem of contact wear and the possibility of poor contact at certain times. The second type of device used has been a magnetic device which depends on circuit changes caused by the change in the permeability of a ferrite core when saturated by a magnetic spot. This type of device has limited resolution due to the interaction of the adjacent magnetic spots on the rotating member. Special precautions must often be taken to shield the sensor from magnetic fields that tend to demagnetize the spots. Conversely, shielding may also be required to prevent the coded disc from magnetically affecting adjacent equipment. This consideration adds to the cost of an already costly device. The third type is a capacitive device in which the capacitance in an electric circuit is changed thereby changing the signal current. This technique also usually requires brushes and slip rings and their attendant problems. They are also sensitive to stray capacitances and usually require that the electronic circuits used therewith be placed in close proximity because stray capacitance and connecting cables will compromise the performance. The fourth type and the one which has probably gained most acceptance in the prior art is the optical device which depends on interrupting a beam of light that is picked up by a photoelectric cell to produce an output voltage. The main drawback of this device is the limited life expectancy of the light sources in the sensor. The drawbacks of using an analog device and converting it to a digital output are evident. Thus, the need for a low cost digital type sensor or encoder which is capable of operating at high rotational speeds and is reliable is evident.

SUMMARY OF THE INVENTION

The preferred embodiment of the present invention utilizes a disc of non-magnetic material mounted on the input shaft of the device and free to rotate with the shaft relative to a stator assembly. Segments of magnetic material are embedded in equally spaced relation around the circumference of the disc, the number of segments being determined by the required resolution. The stator comprises a frame of non-magnetic material which holds a plurality of E-shaped magnetic strips into which are inserted a pair of pick-up coils and a pair of excitation coils. The excitation coils are excited by an alternating voltage and magnetic coupling results between the E-shaped portions and the magnetic inserts on the rotor as they pass under the E-shaped strips inducing a voltage in the pick-up coils. This voltage may then be demodulated to provide an indication of rotational position or speed. The number of E-shaped strips and embedded segments are selected such that a plurality of interactions will occur at any given time to provide for averaging and thus cancel out inaccuracies in the system. The addition of a second set of E-shaped strips displaced 90 electrical degrees from that of the first sensor permits determining sense of direction. Other possible modifications such as reversal of the stator and rotor elements and unequal spacing of the magnetic inserts is also described.

BRIEF DESCRIPTION OF THE DRAWINGS

FIG. 2 is a perspective view illustrating the magnetic coupling between the E-shaped strips and the inserts of FIG. 1.

FIG. 5 is a waveform diagram illustrating the waveforms developed at various portions of the system of FIG. 4.

FIG. 6 is another block diagram; and

FIG. 6A is another waveform diagram.

DETAILED DESCRIPTION OF THE PREFERRED EMBODIMENT

Figure 1:
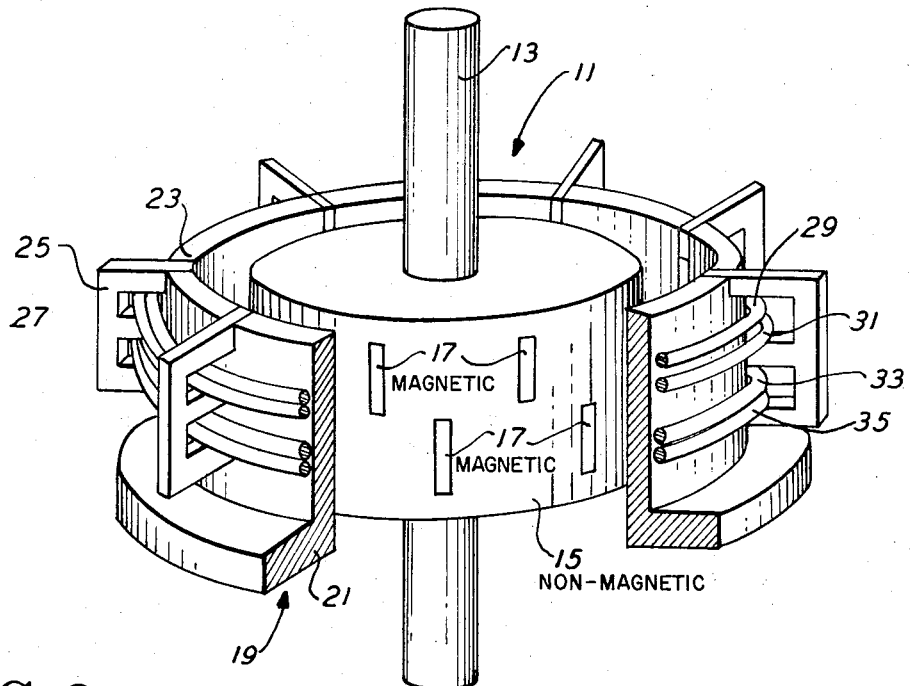
FIG. 1 is a partially cut away perspective view of the sensor of the present invention.
Figure 1A:
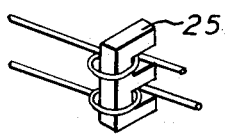
FIG. 1A is a view showing an alternate winding arrangement for the embodiment of FIG. 1.

FIG. 1 is a perspective view of the preferred embodiment of the sensor of the present invention. A rotor 11 comprising a shaft 13 and a disc or cylinder 15 made of a non-magnetic material and having thereon a plurality of magnetic segments 17 will be mounted for rotation in bearings in a conventional case (not shown). The magnetic segments 17 may be embedded, or, deposited on, or fastened to disk 15. A stator assembly 19 which is permanently affixed to the case comprises a frame 21 containing slots 23 into which are inserted E-shaped strips of magnetic material 25. In some applications the disk 15 will be attached to an existing shaft and stator assembly 19 mounted in some other fashion to existing fixed supports in which instance the device need not be separately encased. It should also be noted that the stator and rotor elements may be reversed, i.e., the segments 17 could be on a stator and E-strips 25 on a rotor. Wound around the frame 21 through openings 27 in the E-shaped strips are four coils 29, 31, 33, and 35. The magnetic segments 17 should preferably be of a material such as 4750 or HYMU 80. As shown they form an upper and lower row around the circumference of the cylinder 15. In each row, the segments are equally spaced around the circumference with the segments in the lower row falling half way between those in the upper row and vice versa. (Equal spacing is not absolutly necessary and in some cases another arrangement will prove to be more desirable). The coils 29, 31, 33, and 35 are shown as a single wire. However, they will generally comprise a plurality of turns wound in a manner well known in the art. Coils may also be wound around each individual E-strip 25 as shown on FIG. 1A. The strips 25 may also take other shapes such as a U-shape, etc.

Figure 3:
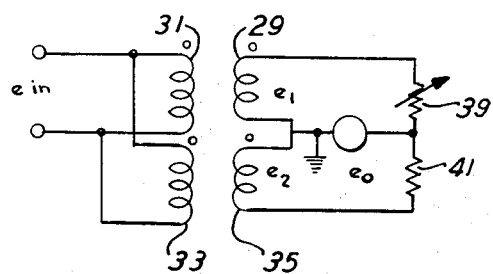
FIG. 3 is an electrical circuit diagram of the magnetic circuit of FIG. 2.

FIG. 2 shows the magnetic circuit at one of the E-shaped strips of FIG. 1 and FIG. 3 shows an electrical schematic of the same circuit. An input a.c. voltage is impressed across the coils 31 and 33 resulting in a current in each equal to $I \sin \omega t$. (Good results may also be obtained using waveforms other than sinusoidal e.g. square or tri-angular waves. In cases where at rest measurements, need not be made, DC excitation may also be used. In high speed operation DC excitation is preferred since it provides increased bandwidth for the sensor.) This results in a magnetic field as indicated by the dotted line 37. For the relative positioning shown in the figure, neither the upper magnetic segment 17a nor the lower magnetic segment 17b is in the magnetic circuit at this point. The result is that equal voltages $e_1$ and $e_2$ will be induced in coils 29 and 35. As shown on FIG. 3, the two coils have their one side tied together. The other side of coil 29 is provided to a resistor 39 and the other side of coil 35 to a resistor 41. Resistors 39 and 41 have their other ends tied together thereby forming a bridge circuit with coils 29 and 35. The output voltage indicated as $e_0$ is taken across the bridge between the common point of the two coils and the common point of the two resistors. In the position shown on FIG. 2, the two voltages $e_1$ and $e_2$ will be equal and thus the bridge output voltage at that point will be zero. Resistor 39 is made variable so that any unbalances may be cancelled out at this point by adjustment thereof. When the segment 17a is moved to a position where it is directly opposite the E-shaped strip 25, the magnetic field will pass through the segment 17a and through the center of the E-shaped strip, inducing a larger voltage in coil 29. This will cause an unbalance in the output bridge circuit of FIG. 3 and bridge output voltage which is in phase with the reference will result. After the segment 17a moves away from the E-shaped strip 25 and 17b moves into the magnetic path, a larger voltage will now be induced in the coil 35. This will result in an output voltage which is out of phase with the reference. These outputs are shown on FIG. 5 and will be explained in more detail in connection with FIG. 4. Other types of output circuits may equally well be used. For example, coils 29 and 35 may be made to oppose each other and a voltage taken from their junction.

By increasing the number of E-shaped cores and the segments in a particular relationship, the 360° of rotation of the rotor may be accurately divided into many discrete parts. The angular spacing of the rotor segments relative to the angular spacing of the stator segments results in the division of the total rotation by a multiple of the number of rotor and stator segments. This results in a large number of divisions with relatively few segments and E-strips. The number of positive and negative cycles resulting at the output of the circuit of FIG. 3 may be expressed by the following formula:

$$p = N_s (N_r)/D_h$$

where $p$ equals the total number of positive and negative pulses, $N_s$ equals the number of equally spaced stator segments, $N_r$ equals the number of equally spaced rotor segments and $D_h$ equals the greatest denominator between $N_s$ and $N_r$. $D_h$ will also represent the relative signal strength and the degree of space error averaging as will be seen below. For example, if the stator has 15 E-shaped cores equally spaced around the stator and the rotor has 24 top segments and 24 bottom segments, the number of output pulses will be as follows:

$$p = 15 \times 24 \times 2/3 = 240$$

$N_s = 15$
$N_r = 24 \times 2$
$D_h = 3$

The number $D_h = 3$ indicates that each output pulse is the summation of the voltage produced by 3 E-shaped cores spaced 360° divided by 3 (360°/3) or 120° apart. By summing these 3 voltages, the errors generated by eccentricity, roundness of rotor and stator and the spacing errors of the cores and segments is minimized.

Figure 4:
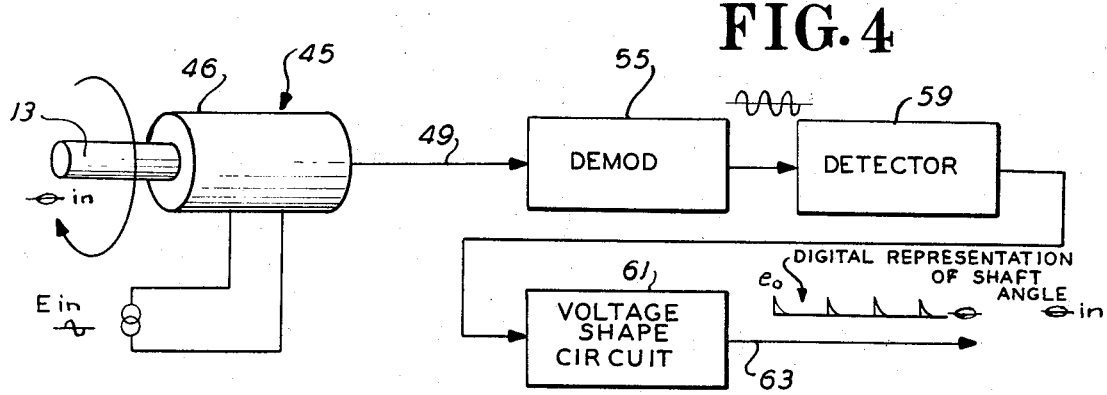
FIG. 4 is a block diagram showing the sensor of the present invention along with a possible output configuration.

FIG. 4 illustrates a typical output circuit for the device described above. The sensor 45 which includes a case 46 in which the rotor shaft 13 is mounted for rotation within the stator is excited by an AC input voltage from a source 47. An output corresponding to the output $e_0$ of FIG. 3 is provided on line 49. The input AC waveform will be as shown by trace 51 of FIG. 5. The output will be the same AC waveform modulated by the encoder in response to rotation thereof as shown by the waveform 53. For the example given above, each half cycle of modulation represents 1.5° of rotation of the rotor 13 of the sensor. This output on line 49 is provided to a demodulator 55. The demodulator will demodulate and filter the input to provide an output shown by the waveform 57 which contains only the modulation information. This is then provided to a detector 59 which could, for example, be a zero crossover detector or a peak detector which will respond to either the zero crossings or the peaks of waveform 57 and provide an output at each of those points. This output is then provided to a voltage shaping circuit 61, for example, a Schmitt trigger, which will provide a series of output pulses on line 63 which may then be used for further processing. For example, these output pulses could provide inputs to a counter which keeps track of the position of the shaft 13.

The above described encoder will not provide information as to sense of direction. However, if an additional stator sensing arrangement is provided with the E-strips 25 on the stator displaced 90 electrical degrees from those of the first sensing arrangement, two outputs which are 90° phase shifted from one another will be provided. The second set of E-strips 25 would then be placed between those of the first set and two sets of sensing coils individually wound as shown on FIG. 1A i.e., each sensing coil would be wound on every other E-strip 25. In this manner, by determining which output leads or lags the other, it will be possible to also determine sense of rotation. In the example given above, where the output on line 63 is used as the input to a counter, the sense of direction input could then be used to gate these pulses into either the up or down count inputs of that counter and thus an accurate indication of shaft position for rotations in both directions could be maintained.

This is illustrated by FIG. 6. The sensor of block 71 contains all the elements of FIG. 4 and in addition a second sensing assembly and provided respective first and second outputs on lines 75 and 77. The magnetic E-strips 25 are arranged 90° apart as described above to provide outputs as shown by waveforms 79 and 81 of FIG. 5(a). (Assuming moving in one direction.) It can be seen that as long as the direction remains the same, outputs will be obtained alternately from line 75 and 77. However, if the encoders change direction two consecutive pulses will occur on one of the outputs, i.e., assume pulse 83 has just occurred and the shaft reverses. The same insert will be defected and another pulse 83 will occur before a pulse on the other waveform. The outputs on lines 75 and 77 are used as respective set and resets inputs to a flip flop 85. The flip flop outputs respectively enable AND gates 87 and 89. The other input to gate 87 is the output on line 75 and the other input to gate 89 the output on line 77. A pulse on line 75 will set flip flop 85 enabling gate 87. But, if the next pulse is on line 77, flip flop 85 will be reset thereby and gate 87 disabled when the next pulse on line 75 occurs. As long as motion is in one direction the flip flop 83 will be alternately set and reset and gates 87 and 89 will not be enabled when pulses occur on lines 75 and 77. However, if direction changes then the flip flop will not change state before the next pulse on line 75 or 77 and one of gates 87 or 89 will be enabled to allow the pulse to pass through. The outputs of gates 87 and 89 are tied together and form a trigger input to a flip flop 91, thus each time two pulses occur in succession on one of line 75 or 77, indicating a change of direction, flip flop 91 will change state. The outputs of flip flop 91 provide the up and down enables to an up-down counter 93 obtaining count inputs on line 75 from encoder system 1. In this way, the count will always accurately reflect shaft position.

Thus, an improved digital position sensor or encoder which provides good reliability and accuracy at low costs and has essentially no moving parts other than the bearings in which it is mounted has been shown. Although specific embodiments have been shown and described, it will be obvious to those skilled in the art that various modifications may be made without departing from the spirit of the invention which is intended to be limited solely by the appended claims.

What is claimed is:

1. A digital position sensor comprising:
   a. a plurality of magnetic elements arranged on a non-magnetic surface to form an upper and a lower row of spaced elements;
   b. a pickup assembly in spaced relationship to said rows, said assembly comprising:
      a support member having a plurality of shaped magnetic segments attached thereto with an upper portion of each segment aligned with said upper row and a lower portion aligned with said lower row;
      a first excitation coil magnetically coupled to the upper portions of said segments;
      a first pickup coil similarly coupled to said upper portions;
      a second excitation coil magnetically coupled to the lower portions of said segments; and
      a second pickup coil similarly coupled to said lower portions; and
   c. means to effect relative motion between said rows and said assembly.

2. The invention according to claim 1 wherein said non-magnetic surface comprises a disk affixed to a shaft for rotation therewith, said elements being spaced about circles on said disk, and said support member is annular in shape.

3. The invention according to claim 2 wherein said shaped magnetic segments are E-shaped and said first excitation and first pickup coils are wound through the upper openings in the Es and said second excitation and second pickup coils are wound through the lower openings in the Es.

4. The invention according to claim 3 wherein said inserts and E-shaped segments are of a quantity and so spaced that when one insert in a row is radially aligned with an E-shaped segment, at least one other insert in the same row will also be aligned with an E segment, thereby permitting an averaging effect.

5. The invention according to claim 1 wherein each of said first and second excitation coils are coupled to a voltage source and further including means to sense the voltages induced in said first and second pickup coils to provide an output.

6. The invention according to claim 5 wherein one lead of said first pickup coil is connected to the lead of opposite polarity of said second pickup coil and further including:
   a. a first resistor having one end coupled to the other side of said first coil; and
   b. a second resistor having one end coupled to the other side of said second coil and its other side to the other side of said first resistor thereby forming a bridge circuit with said coils, whereby an output may be taken across the junction of said first and second coils and said first and second resistors.

7. The invention according to claim 6 wherein said voltage is an alternating voltage.

8. The invention according to claim 6 wherein one of said first and second resistors is variable to permit balancing the bridge.

9. The invention according to claim 6 and further including:
   a. a demodulator obtaining its input from across said bridge; and
   b. a detector to detect each half cycle of output from said demodulator whereby each output of said detector will represent an increment of rotor motion.

10. The invention according to claim 9 wherein said detector is a zero crossover detector.

11. The invention according to claim 9 wherein said detector is a peak detector.

12. The invention according to claim 9 and further including a pulse shaping circuit coupled to the output of said detector.

13. The invention according to claim 12 and further including a counter coupled to said shaping circuit to maintain a count indicative of shaft position.

14. The invention according to claim 13 and further including:
   a. a second pickup system including a second set of shaped magnetic segments, third and fourth pickup coils, a second bridge circuit, a second demodulator, a second detector, and a second pulse shaping circuit, the segments of said second set arranged to provide outputs which are out of phase with the first set of shaped segments;
   b. means sense the relative occurrence of outputs from the first and second pickup systems to provide an indication of direction of motion; and c. wherein said counter is an up-down counter obtaining its up and down enabling inputs from said sensing means.

15. A digital position sensor comprising:
a. a rotor including a rotor shaft and a cylindrical disc of non-magnetic material affixed thereto;
b. a plurality of magnets arranged on said cylindrical disc to form an upper and a lower row of space elements;
c. a cylindrical stator assembly surrounding said disc said stator assembly comprising:
   an annular support ring having a plurality of equally spaced slits about its circumference;
   a plurality of E-shaped magnetic segments inserted into the slits with the upper opening of each aligned with said upper row and the lower opening of said E aligned with said lower row;
   a first excitation coil wound about said support through the upper openings of said E segments;
   a first pick up coil similarly wound through said upper opening;
   a second excitation coil wound about said support through the lower opening of said E segment; and
   a second pick up coil similarly wound through said lower openings; and
c. a case surrounding stator and rotor and including means to support said rotor for rotation within said stator.

* * * * *